United States Patent [19]

Bachmann

[11] Patent Number: 4,682,240
[45] Date of Patent: Jul. 21, 1987

[54] INTERLOCKED TELEVISION CAMERA AND ELECTRONIC VIEWFINDER COMBINATION

[75] Inventor: Horst Bachmann, Reinheim, Fed. Rep. of Germany

[73] Assignee: Robert Bosch GmbH, Stuttgart, Fed. Rep. of Germany

[21] Appl. No.: 866,568

[22] Filed: May 22, 1986

[30] Foreign Application Priority Data

Jun. 7, 1985 [DE] Fed. Rep. of Germany ....... 3520457

[51] Int. Cl.$^4$ ............................................. G03B 13/10
[52] U.S. Cl. .................................... 358/224; 354/223
[58] Field of Search ....................... 358/224, 229, 254; 354/222, 223

[56] References Cited

U.S. PATENT DOCUMENTS

| | | | |
|---|---|---|---|
| 3,627,923 | 12/1971 | Bachmann | 358/224 |
| 4,409,619 | 10/1983 | Takubo | 358/224 |
| 4,506,967 | 3/1985 | Barzee | 358/224 |
| 4,605,296 | 8/1986 | Munnion | 358/224 |

Primary Examiner—Gene Z. Rubinson
Assistant Examiner—L. C. Schroeder
Attorney, Agent, or Firm—Frishauf, Holtz, Goodman & Woodward

[57] ABSTRACT

The top surface (1a) of the TV camera has a tower block (5, 6) secured thereto including, for example, a "camera ON" or "red light" indicator. To provide for movement of an electronic viewfinder in form of a TV monitor (2) while preventing inadvertent rotation of the viewfinder unless the viewfinder is lifted away from the tower block, and hence to prevent damage to the tower block, an interlock arrangement is provided to prevent rotary movement of the electronic viewfinder unless the viewfinder is pivoted away from its rest position against the top surface of the TV camera into a raised working position, with interlocks (16, 17, 18, 27, 28) interlocking a first attachment arrangement securing the block structure to the electronic viewfinder for rotation about a horizontal axis (17) and a second attachment arrangement (13, 14) permitting pivoting movement of the block structure about a vertical axis, the first and second attachment arrangements being interlocked to prevent movement about both the horizontal axis (7) and the vertical axis (13a) when the viewfinder is not moved from its rest position into a raised, working position.

20 Claims, 3 Drawing Figures

INTERLOCKED TELEVISION CAMERA AND ELECTRONIC VIEWFINDER COMBINATION

The present invention relates to television cameras, and more particularly to television cameras having an electronic viewfinder which is coupled to the camera but is independently movable with respect to the camera, for example to facilitate observation by a camera operator.

BACKGROUND

It has been found desirable to locate an electronic viewfinder or a monitor, monitoring the image "seen" by a television camera in such a position that it can be located independently of the alignment of the camera with respect to a subject. This permits the camera operator to follow the scene being picked up by the camera on the monitor screen, and to control the camera in accordance with directions, for example from the director of a play or the like, without necessarily physically following all movements of the camera. Electronic viewfinders or electronic monitors used with cameras frequently are horizontally rotatable as well as vertically pivotable with respect to the camera housing. Some cameras have an essentially flat top surface from which a power block extends, housing parts of the camera and, additionally, a widely visible "red-light" indicator, showing that the camera is ON. Movement of the viewfinder may cause damage to the power and particularly to the "red-light" indicator unless the movement of the viewfinder is so arranged that the viewfinder will be out of the way with respect to the tower and "red-light" indicator when being rotated with respect to the camera housing.

THE INVENTION

It is an object to interlock an electronic viewfinder or monitor with the camera housing which permits relatively large horizontal and vertical movement of the viewfinder while preventing damage to the camera construction, and particularly to a camera tower block, for example housing a "red-light" indicator.

Briefly, rotary movement of the electronic viewfinder is prevented unless the viewfinder is pivoted away from a rest position in which it is flat against the top surface of the camera housing into a working position where it is removed from the top surface of the housing and swung away from the tower block. The viewfinder is secured to the top side of the housing by a first attachment means which permits pivotable movement about a horizontal axis and, further, by a second attachment means which permits movement of the viewfinder about a vertical axis. The first and second attachment means are so interlocked that movement about the horizontal axis is not possible unless the viewfinder is moved about the horizontal axis away from its rest position against the top surface of the housing into working position removed from and pivoted away form the tower block, including the "red-light" indicator. In accordance with a preferred feature of the invention, a strut is connected to a pivot arm controlling pivoting movement of the viewfinder upwardly from the top surface of the housing; upon such pivoting movement, the strut releases a locking element which locks the second attachment means in a position in which the viewfinder is in alignment with the camera, and hence can be fitted against the tower block. Conversely, movement of the viewfinder without pivoting the viewfinder about horizontal axis, forming the pivoting axis of the first detachment means, the viewfinder cannot be rotated.

DRAWINGS

DETAILED DESCRIPTION

Figure 1:
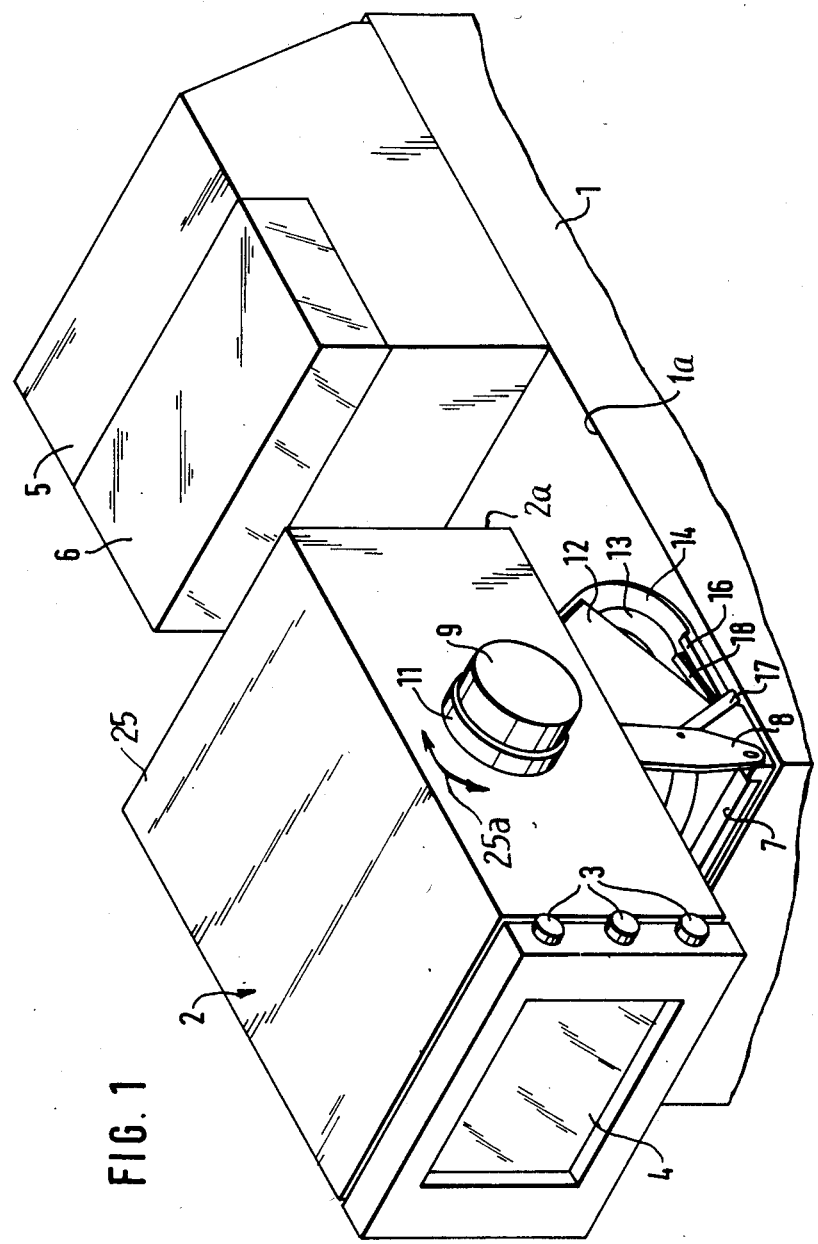
FIG. 1 is a perspective illustration of a television camera, shown only in fragmentary form, with an electronic viewfinder in form of a small monitor, attached thereto.

A television camera 1, shown only in fragmentary form, and which may be of any suitable contruction, is formed with a flat top surface 1a. An electronic viewfinder or monitor is located on the camera, movable between a rest or folded flat position against the camera top surface 1a and an extended or operating or working position. FIG. 1 shows the monitor in the extended or operating or working position. Electronic viewfinders or monitors include a small TV receiver, having operating knobs 3, located close to the screen 4 thereof. The top surface 1a of the camera carries a tower block 5 which has a signaling light or "red-light" indicator 6 located thereon.

The monitor, as illustrated in FIG. 1, is pivoted upwardly into the working or operating position, for ease of observation by a camera operator. When folded against the camera, the monitor 2 will be in a terminal or end position termed a "rest" position, in which the bottom side of the monitor 2 will be flat against or just about against the upper side 1a of the camera 1. The back side 2a of the monitor 2 will be in engagement with, or close to the tower 5. The monitor, as shown, usually is of essentially rectangular "block" construction. When folded flat against the top surface 1a of the camera, the monitor 2 and the tower 5 form an essentially uninterrupted smooth surface, for ease of transport and minimum opportunity for damage thereto.

The monitor 2 can be pivoted upwardly about a horizontal axis 7 by raising the monitor 2 and pivoting the pivot levers 8 upwardly. The pivot levers 8 are preferably secured to the monitor 2 to pass through or closely adjacent the center of gravity of the monitor 2. Handles 5 are provided to lock the monitor 2 in respective rest or operating conditions or, if desired, in intermediate positions. The handles 9 lock the monitor by frictional engagement, as will appear. When the monitor is in its operating or working position, as shown in FIG. 1, it can, additionally, be tilted about a horizontal axis passing through the center of button 9, to be clamped in a desired position by the control knob 11, as will appear. Upon pivoting the monitor 2 from the rest position into the working position, and reversely, a gear 21 (FIG. 2), and coupled to the button or handle 9, runs off against a rack or toothed segment 12 (FIGS. 1 and 2).

Figure 3:
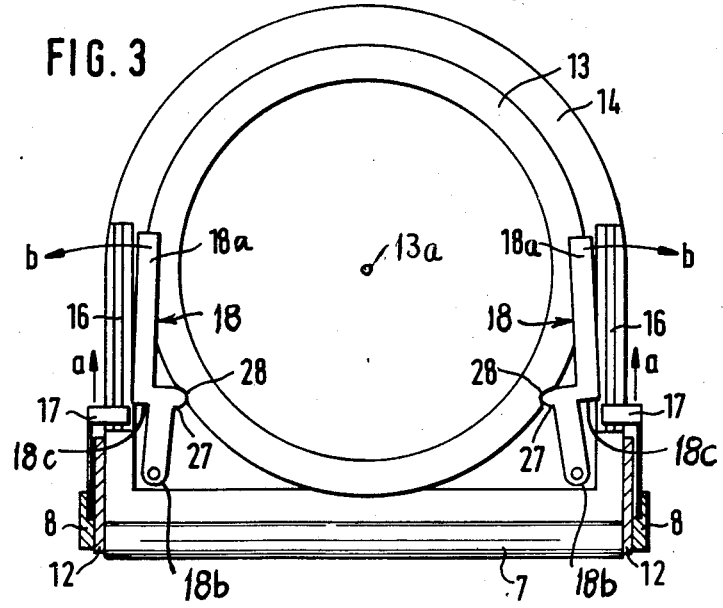
FIG. 3 is a top view of the horizontal rotating arrangement, showing the interlock, with the viewfinder housing removed.

When the swing levers 8 are in a vertical position, so that the monitor is in its operating or working position, the monitor can be rotated about a vertical axis 13a (FIG. 3). For such rotation, a bearing ring 13 is located on the upper side of the TV camera 1. A base plate 14 is rotatable with respect to the bearing ring 12. The pivot levers 8 and the rack segment 12 are secured to the plate 14. The plate 14 is formed with lateral guide grooves 16, one at each side and parallel to the upper edges of the housing of the camera. A link lever 17, one on each side of the monitor 2, is located in the respective guide grooves 16. The link levers 17 are pivoted on the pivot links 8. A locking lever 18 is located on the base plate 14, in the region or close to the guide grooves 16. The function of the interlock arrangements, including the levers 17 and 18, will be explained below.

Figure 2:
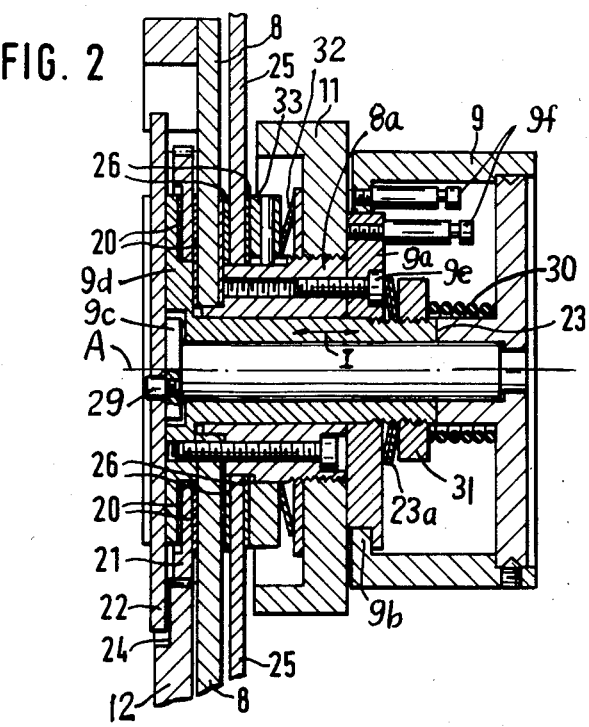
FIG. 2 is an axial cross-sectional view through a portion of the vertical pivoting arrangement, that is, to pivot the viewfinder about a horizontal axis.

FIG. 2 shows an axial section of the handles or knobs or levers 9 and 11, as well as the clamping and friction arrangement coupled thereto. The handle 9 can be used to eliminate friction formed by brake linings 20 against the gear 21 running on the rack segment 12. An engagement element 22 can be lifted by the handle 9 via a coupling 23 and inserted in a notch 24 formed in an end of the rack segment 12. This permits locking the monitor in working or operating condition, and thereby preventing possible shifting thereof.

The handle 11 permits clamping of the housing 25 of the monitor by brake linings 26 against the pivot levers 8. The handle 11, thus, permits clamping the housing 25 of the monitor in any selected tilted position. Changing tilt of the monitor 2 is schematically indicated in FIG. 1 by arrow 25a.

The swing lever 8 are securly connected to the bearing 8a. The ring 9a of the handle 9 is journalled axially and radially on the abutment 9b. The abutment 9b is securly screw-connected with the bearing 8a.

The central axis A is provided with an eccentrically located bolt 29 on the left side, which, upon rotation of the axis A releases the engagement element 22 of the pivot levers in the upper terminal position. The central axis A is interengagingly connected (square part 9c) with the cam disk 9d.

The ring 9a of the handle 9 is screw-connected with the cam disk 9d by screws 9e. Upon rotation of the handle 9, the engagement 22 is released and simultaneously the sleeve 23 is moved towards the left and thus the friction (clamping) of the gear 21 with the pivot element 8 is released and the monitor 2 can be moved vertically, since the gear 21 can roll off on the gear segment 12. The compression spring 30 as shown only removes axial play of the handle 9 with the cam disk 9d in quiescent position, so that these parts cannot rattle.

A return spring for the handle is hooked on the two pins 9f.

The cup spring 23a on the axially shiftable sleeve 23 provide the engagement pressure for the friction I. The engagement pressure can be adjusted with the nut 31.

The handle 11 is adjustable on the bearing 8a by a thread. A pressure disk 33, secured against rotation is pressed against the housing 25 thereby via a cup spring 32. A brake lining 26 is located on the inner and outer side of the housing 25 in order to increase friction. If the handle 11 is completely rotated towards the left (in direction of the end of the arrowed 1), the monitor housing (25) is securely pressed on the pivot lecvers 8 and tilting in vertical direction is no longer possible.

The interlock of the monitor housing 25 with the camera 1 is best seen by reference to FIG. 3 The illustration of FIG. 3 shows the position of the interlock elements when the monitor is in the rest position, that is, when the monitor would be folded back against the top surface 1a of the camera, that is, with its bottom surface parallel to the top surface 1a of the camera. Two Z-shaped or dog-legged interlock or safety levers 18 are provided, having rollers 27 attached thereto located at the intermediate offset of the levers 18—see FIG. 3. The rollers 27 fit into notches 28 of the outer surface of the bearing ring 13. When in this position, the end portions 18a of the levers are removed from the guide groove 16 and the links 17 can slide freely in the grooves 16 upon pivoting of the monitor 25 about the horizontal axis 7. Upon lowering or pivoting the monitor 2 downwardly, that is, moving the monitor 2 in vertical direction from the operating terminal position in the direction towards the rest terminal position, links 17 will slide in the groove 16 in the direction of the arrows a (FIG. 3). This sliding movement will, simultaneously, block movement of the levers 18 in the direction of the arrows b. Thus, rotary movement of the monitor about the vertical axis 13a is not possible already upon only slight movement of the monitor from its operating position towards the rest position.

Let it be assumed that the monitor 2 has been lifted, that is, pivoted to the operating position about axis 7. In this position, the monitor 2 can be readily rotated about the vertical axis 13a. Upon rotation of the monitor 2, which will cause rotation of the base plate 14 about the vertical axis 13a, rollers 27 will run out of the notches 28. Upon such movement, the levers 18 will be pivoted about vertical axes 18b, in the direction of the arrows b, which causes blocking of the grooves 16 and engagement of the offsets 18c of the levers 18 with the links 17, thus preventing lowering of the monitor about the axis 7 with the monitor rotated out of its position of alignment, as shown in FIG. 1.

Suitable springs, to maintain the levers 18 in the position shown in FIG. 3 have been omitted from the drawing for clarity; a small spiral spring, for example wrapped about a shaft concentric with the axes 18b would be sufficient; various other suitable arrangements may be used. Likewise, specific showing of transport threads in FIG. 2, to provide for axial movement of the respective elements, has been omitted since this is a matter of mere engineering design. The interlock arrangement formed by links 17 and levers 18 provides for reliable protection of projecting components, such as a tower block 5, from the top surface 1a of the TV camera 1. It is particularly arranged to prevent movement of a monitor or viewfinder 2 unless the monitor or viewfinder has been pivoted from a rest position flat against the top surface of the camera to an operating position. In addition, the viewfinder 2 is protected by the friction drives, built into the handle 9, and the knob 11 from dropping inadvertently from the operating or working position shown in FIG. 1 into the rest position, and thus jarring the camera 1. Engagement of the gear 21 with the rack segment 12, and frictional clamping of the gear by the brake lining 20, prevents any free dropping of the monitor 2 even if the interlock engagement 22, 24 has not reliably engaged.

Various changes and modifications may be made within the scope of the inventive concept.

I claim:

1. Television camera and electronic viewfinder combination,
   in which the television camera (1) has a camera housing formed with an essentially flat top surface (1a) and a tower block (5, 6) projecting upwardly from the top surface;
   an electronic viewfinder (2) of essentially block structure;

first securing means (8, 12) for securing said electronic viewfinder to the top surface (1a) of the camera housing for pivotal movement about a horizontal axis (7) located close to said top surface, to permit pivoting of the electronic viewfinder between a rest position close to the top surface of the TV camera and a working position remote from the top surface;

and second securing means (13, 14) for mounting the electronic viewfinder for rotary movement about a vertical axis (13a), and comprising, in accordance with the invention, means for preventing rotary movement of the electronic viewfinder (2) unless the viewfinder block structure is pivoted away from its rest position and into the working position, including means (16, 17, 18, 27, 28) for interlocking the first securing means (8, 12) and the second securing means (13, 14) and for preventing movement about both the horizontal axis (7) and the vertical axis (13a) when the viewfinder is not moved from its rest position into the working position.

2. The combination of claim 1, wherein the second mounting means comprises a bearing ring (13) secured to the top surface (1a) of the TV camera housing and a base plate (14) secured to the block structure (25) of the electronic viewfinder, and rotatable within said bearing ring, said first securing means (8, 12) being secured to said base plate.

3. The combination of claim 2, wherein the first securing means includes a pair of pivot levers (8) pivotably connected to said block structure of the electronic viewfinder and pivotable about said horizontal pivot axis;

and a rack gear segment—gear coupling (12, 21) respectively connected to the base plate (14) and rotatably connected to said block structure (25) to control pivoting movement of said block structure about said horizontal axis.

4. The combination of claim 2, further comprising a pair of pivot levers (8) pivotable about said horizontal axis and pivotably connected to support said block structure (25) of the electronic viewfinder;

and wherin the interlock means comprises a pair of links (17) having one link end operatively coupled to the block structure of the electronic viewfinder and another link end slidably guided on the base plate (14);

and at least one locking lever (18) movable between a position interfering with slidable guided movement of the links on the base plate and a position permitting the links on the base plate and a position permitting the links to slide on the base plate, and hence change the position of the electronic viewfinder with respect to the top surface (1a) of the TV camera, said at least one locking lever additionally being engageable with the bearing ring (13) to permit movement of the links if, and only if, the electronic viewfinder is rotated about said vertical axis (13a) into a position permitting movement between said rest position and said working position.

5. The combination of claim 4, wherein the base plate (14) is formed with grooves (16) to permit sliding movement of said links (17) with respect to the base plate;

the interengagement between the locking lever (18) and said bearing ring being arranged to move the locking levers in a position for preventing movement of said links (17) in said grooves (16), thereby preventing movement of the electronic viewfinder and hence said links when the interlocking lever is engaged with said bearing ring at a position of the electronic viewfinder other than a predetermined position thereof with respect to said tower block (5, 6).

6. The combination of claim 5, wherein two locking levers (18) are provided, having an intermediate offset or Z-shaped portion, the locking levers being pivoted at said other end (18b) to the base plate (14) for pivoting movement about an axis parallel to said vertical axis (13a), the bearing ring (13) being formed with recesses (28) engageable by said offset portions upon pivoting movement of the locking levers towards said bearing ring, said pivoting movement uncovering the groove (16) wherein said links (17) are slidable, to permit sliding movement of said links only when said base plate and said bearing ring have a predetermined alignment.

7. The combination of claim 6, wherein the offset portion is formed with a shoulder (18c) engageable with said links (17) when the locking levers are moved out of the recesses of the bearing ring (13) and are slidable on the circumference of the bearing ring to prevent sliding movement of said links in said grooves when the bearing ring and the base plate are in a random position other than said aligned position.

8. The combination of claim 7, wherein the locking levers include a camming roller (27) engageable with respective recesses (28) in the bearing ring, said camming rollers being located at a corner of the offset or Z-shaped portion of the locking lever facing the bearing ring.

9. The combination of claim 1, wherein the first means include a pair of pivot levers (8) pivotable about said horizontal axis (7) and pivotably connected to said block structure (25) of the electronic viewfinder at opposite sides of said block structure;

a toothed or rack segment—gear coupling being located between the top of the surface (1a) of the TV camera (1) and said block structure to provide for controlled pivotable movement of said block structure about said horizontal axis.

10. The combination of claim 9, wherein the gear is located to be rotatable about the pivot axis of the pivot levers (8) at the block structure, said pivot axis of the block structure passing at least approximately through the center of gravity of the electronic viewfinder (2).

11. The combination of claim 9, further including a friction clamping arrangement for clamping the gear (21) frictionally to clamp the TV camera in any desired position between said rest position and said working position and to lock the gear (21) on the toothed or rack segment.

12. The combination of claim 11, further including operating knobs (9) located laterally of said block structure and controlling the friction clamping arrangement.

13. The combination of claim 2, including pivotable connection means connecting the block structure of the electronic viewfinder to said pivot levers (8) for pivotable movement about a second horizontal axis.

14. The combination of claim 13, further including a control knob for adjusting the pivoting position of the electronic viewfinder about said second axis in selected clamped oriented positions.

15. The combination of claim 12, further including interengaging locking means (22, 24) located adjacent the respective gear (21) and operable to interlock the electronic viewfinder on the toothed or rack segment when the electronic viewfinder is in working position for reliably locking said electronic viewfinder in said working position.

16. The combination of claim 15, wherein said interengaging locking means (22, 24) comprises a recess (24) and a movable engagement element (22) operatively connected with the operating knobs (9), the recess being located at an end position of each one of the rack gear segments (12).

17. The combination of claim 16, wherein the second mounting means comprises a bearing ring (13) secured to the top surface (1a) of the TV camera housing and a base plate (14) secured to the block structure (25) of the electronic viewfinder, and rotatable within said bearing ring, said first securing means (8, 12) being secured to said base plate to provide for secure positioning of the TV camera (1) in rotary as well as tilting direction.

18. The combination of claim 9, wherein the second mounting means comprises a bearing ring (13) secured to the top surface (1a) of the TV camera, and a base plate (14), rotatable relative to said bearing ring;

and wherein said pair of pivot levers (8) are secured to said base plate, pivotable about said horizontal axis (7).

19. The combination of claim 18, further comprising pair of pivot levers (8) pivotable about said horizontal axis and pivotably connected to support said block structure (25) of the electronic viewfinder;

and wherein the interlock means comprises a pair of links (17) having one link end operatively coupled to the block structure of the electronic viewfinder and another link end slidably guided on the base plate (14);

and at least one locking lever (18) movable between a position interfering with slidable guided movement of the links on the base plate and a position permitting the links on the base plate and position permitting the links to slide on the base plate, and hence change the position of the electronic viewfinder with respect to the top surface (1a) of the TV camera, said at least one locking lever additionally being engageable with the bearing ring (13) to permit movement of the links if, and only if, the electronic viewfinder is rotated about said vertical axis (13a) into a position permitting movement between said rest position and said working position.

20. The combination of claim 18, wherein the base plate (14) is formed with grooves (16) to permit sliding movement of said links (17) with respect to the base plate;

the interengagement between the locking lever (18) and said bearing ring being arranged to move the locking levers in a position for preventing movement of said links (17) in said grooves (16), thereby preventing movement of the electronic viewfinder and hence said links when the interlocking lever is engaged with said bearing ring at a position of the electronic viewfinder other than a predetermined position thereof with respect to said tower block (5, 6).

* * * * *